(12) United States Patent
Kim et al.

(10) Patent No.: US 8,167,462 B2
(45) Date of Patent: May 1, 2012

(54) ILLUMINATION LENS AND ILLUMINATION UNIT INCLUDING THE SAME

(75) Inventors: Eun Hwa Kim, Uiwang-si (KR); Dong Nyung Lim, Gwangju (KR); Hyun Min Kim, Yongin-si (KR); Sung Ho Hong, Gimpo-si (KR)

(73) Assignee: LG Innotek Co., Ltd., Seoul (KR)

( * ) Notice: Subject to any disclaimer, the term of this patent is extended or adjusted under 35 U.S.C. 154(b) by 194 days.

(21) Appl. No.: 12/652,680

(22) Filed: Jan. 5, 2010

(65) Prior Publication Data
US 2010/0296265 A1    Nov. 25, 2010

(30) Foreign Application Priority Data

May 25, 2009  (KR) .................. 10-2009-0045342

(51) Int. Cl.
*F21V 5/02* (2006.01)
(52) U.S. Cl. .............. 362/311.02; 362/311.06; 362/336; 362/337; 362/340
(58) Field of Classification Search ............. 362/311.02, 362/249.02, 800, 311.06, 308, 309, 339, 362/340, 330, 335, 336, 337
See application file for complete search history.

(56) References Cited

U.S. PATENT DOCUMENTS

| 3,187,177 | A | * | 6/1965 | Meyer | 362/327 |
| 4,080,529 | A | * | 3/1978 | Nagel | 362/235 |
| 4,488,208 | A | * | 12/1984 | Miller | 362/339 |
| 5,230,560 | A | * | 7/1993 | Lyons | 362/297 |
| 5,617,163 | A | | 4/1997 | Ohtake | |
| 6,623,150 | B2 | * | 9/2003 | Roller et al. | 362/520 |
| 2005/0270761 | A1 | * | 12/2005 | Kung et al. | 362/33 |
| 2008/0142822 | A1 | | 6/2008 | Kim et al. | |

FOREIGN PATENT DOCUMENTS

| JP | 2002-304903 A | 10/2002 |
| JP | 2008-181717 A | 8/2008 |
| JP | 2008-243510 A | 10/2008 |

* cited by examiner

*Primary Examiner* — Laura Tso
(74) *Attorney, Agent, or Firm* — McKenna Long & Aldridge LLP (57) ABSTRACT

An illumination lens including a first part being free of prismatic patterns, a second part including prismatic patterns on both sides of the first part and configured to increase light distribution in the both sides of the first part, and a lens cover covering the first and second parts with the first and second parts being disposed on a substantially same plane under the lens cover.

24 Claims, 11 Drawing Sheets

ILLUMINATION LENS AND ILLUMINATION UNIT INCLUDING THE SAME

CROSS-REFERENCE TO A RELATED APPLICATION

The present application claims priority under 35 U.S.C. 119 to Korean Patent Application No. 10-2009-0045342 filed on May 25, 2009, which is hereby incorporated by reference in its entirety.

BACKGROUND OF THE INVENTION

1. Field of the Invention

The present disclosure relates to an illumination lens and an illumination unit including the same.

2. Discussion of the Related Art

Most lighting in homes, offices, parks, etc. is provided via fluorescent and incandescent lamps. However, these types of light sources are not environmentally friendly, tend to have limited or short life spans and have high power consumption. Thus, the costs of operating and maintaining these related art types of lighting sources are significant, especially when considering many light sources are turned on at a single instance.

SUMMARY OF THE INVENTION

Accordingly, one object of the present invention is to address the above-noted and other problems.

Another object of the present invention is to provide a novel illumination lens and corresponding illumination unit having a high light and illuminance distribution.

Yet another object of the present invention is to provide a novel illumination unit including an illumination lens disposed on a plurality of light emitting diodes that improves light and illuminance distribution.

Still another object of the present invention is to provide a novel illumination unit that improves a blind spot generated due to a luminance difference.

To achieve these and other advantages and in accordance with the purpose of the present invention, as embodied and broadly described herein, the present invention provides in one aspect an illumination lens including a first part being free of prismatic patterns, a second part including prismatic patterns on both sides of the first part and configured to increase light distribution in the both sides of the first part, and a lens cover covering the first and second parts with the first and second parts being disposed on a substantially same plane under the lens cover.

In another aspect, the present invention provides an illumination unit including an illumination lens including a first part being free of prismatic patterns, a second part including prismatic patterns on both sides of the first part and configured to increase light distribution in the both sides of the first part, and a lens cover covering the first and second parts with the first and second parts being disposed on a substantially same plane under the lens cover, and a light emitting module disposed under the illumination lens and including a plurality of light emitting diodes mounted on a board.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Reference will now be made in detail to the embodiments of the present disclosure, examples of which are illustrated in the accompanying drawings.

Figure 1:
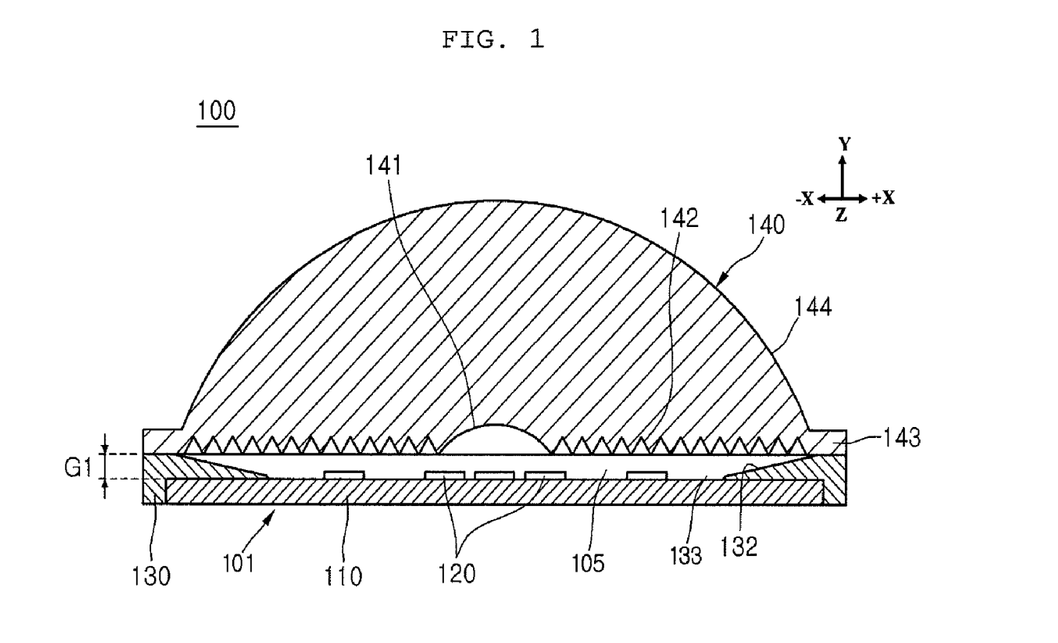
FIG. 1 is a side sectional view of an illumination unit according to a first embodiment of the present invention.

FIG. 1 is a side sectional view of an illumination unit 100 according to a first embodiment. As shown, the illumination unit 100 includes a light emitting module 101, a gap member 130 and a lens 140. The illumination unit 100 may be disposed in an outdoor lamp such as streetlights spaced a predetermined distance form each other. Further, the illumination unit 100 may illuminate light onto an area defined between the streetlights with adequate light and illuminance distribution.

In addition, the light emitting module 101 includes a board 110 and a plurality of light emitting diodes 120 mounted on the board 110. The light emitting diodes 120 are also mounted in various positions on the board 110, which will be discussed in more detail later. Further, the board 110 can be an aluminum board, a ceramic board, a metal core printed circuit board (PCB), a general PCB, etc.

The plurality of light emitting diodes 120 may also be a white light emitting diode (LED). Colored LEDs such as a red LED, a blue LED, and a green LED may also be selectively used as the light emitting diodes 120. In addition, the light emitting diodes 120 preferably have an orientation angle of from about 120° to about 160° and a lambertian shape, but are not limited to this shape and orientation angle.

Figure 2:
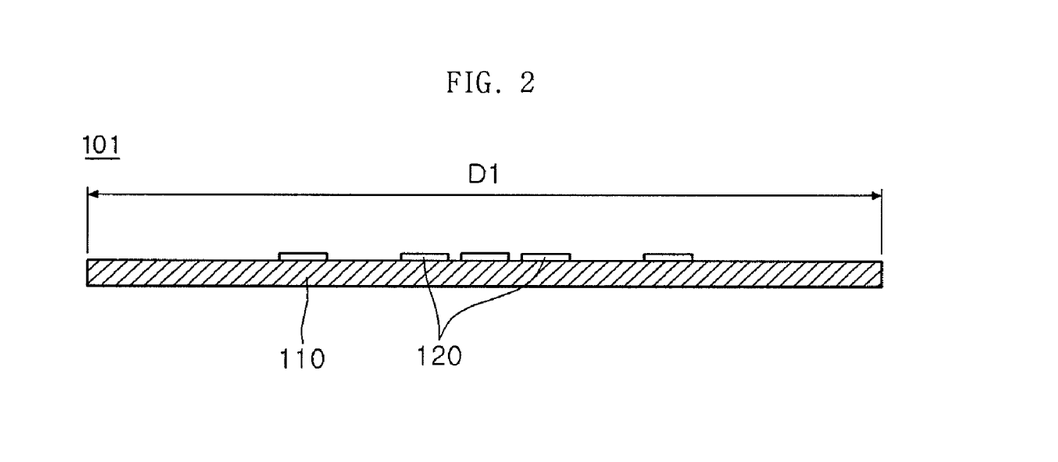
FIG. 2 is a side sectional view illustrating a light emitting module of FIG. 1.
Figure 3:
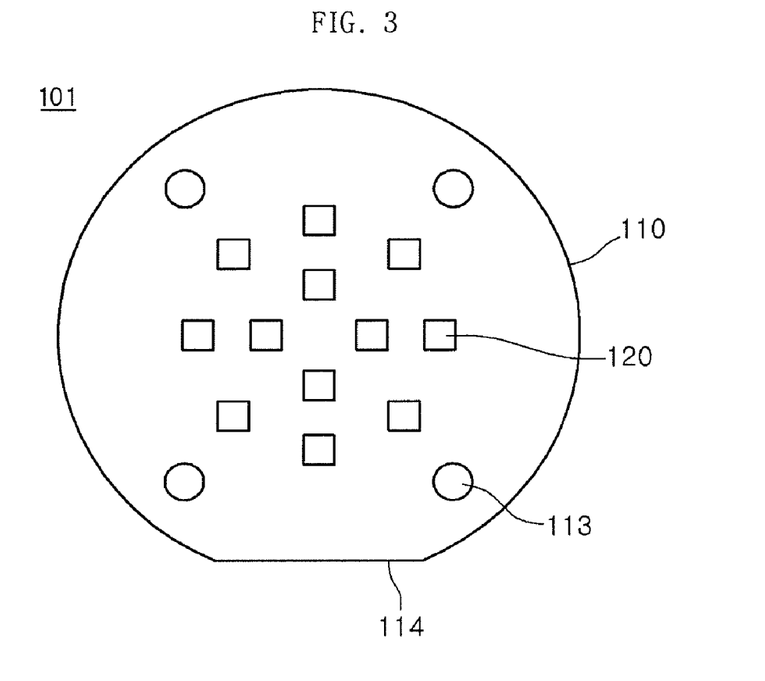
FIG. 3 is a plan view illustrating the light emitting module of FIG. 1.
Figure 4:
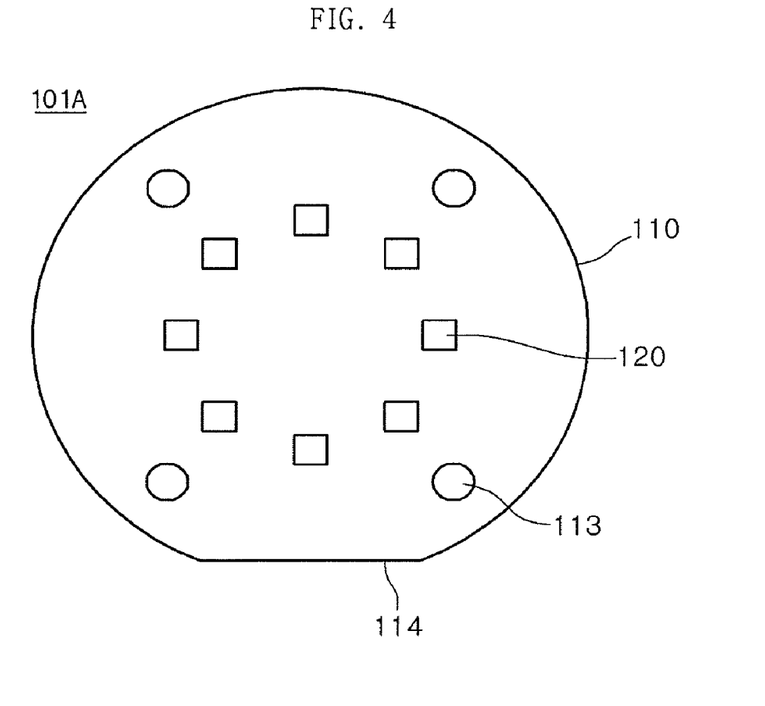
FIG. 4 is a plan view illustrating another example of the light emitting module of FIG. 3.

Next, referring to FIGS. 2 and 3, the board 110 can have a circular Plate shape having a predetermined diameter D1 that is receivable into the gap member 130. A flat part 114 can also be disposed on an outer surface of a side of the board 110 to identify coupling positions between components of the illumination unit 100 or to prevent the components from being rotated. Also, a plurality of screw holes 113 can be defined in the board 110, and be used for coupling the board 110 to a structure such as a streetlight. The board 110 can also be coupled through another fixing unit such as a rivet and a hook. Other coupling mechanisms can also be used Referring to FIG. 3, twelve light emitting diodes 120 are arrayed on the board 110. For example, four light emitting diodes 120 are disposed on each of both sides about a center of the board 110 in a cross pattern shape, and four light emitting diodes 120 are disposed on four edges of the cross pattern shape, respectively. Thus, twelve light emitting diodes 120 are disposed on the board 100. Referring to FIG. 4, eight light emitting diodes 120 are disposed in an array configuration. That is, the eight light emitting diodes 120 are disposed in a circular shape at positions spaced a predetermined distance from each other.

Referring to FIGS. 3 and 4, the array configuration and the number of the light emitting diodes 120 disposed on the board 110 may be varied according to a light intensity, the light distribution, and the illuminance distribution. Further, the array configuration and the number of the light emitting diodes 120 may be changed within the technical scope of the embodiments.

Figure 5:
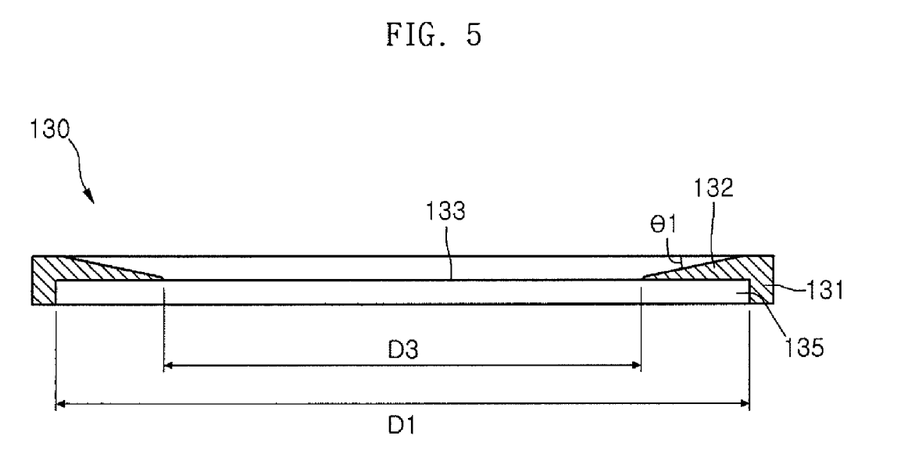
FIG. 5 is a side sectional view illustrating a gap member of FIG. 1.
Figure 6:
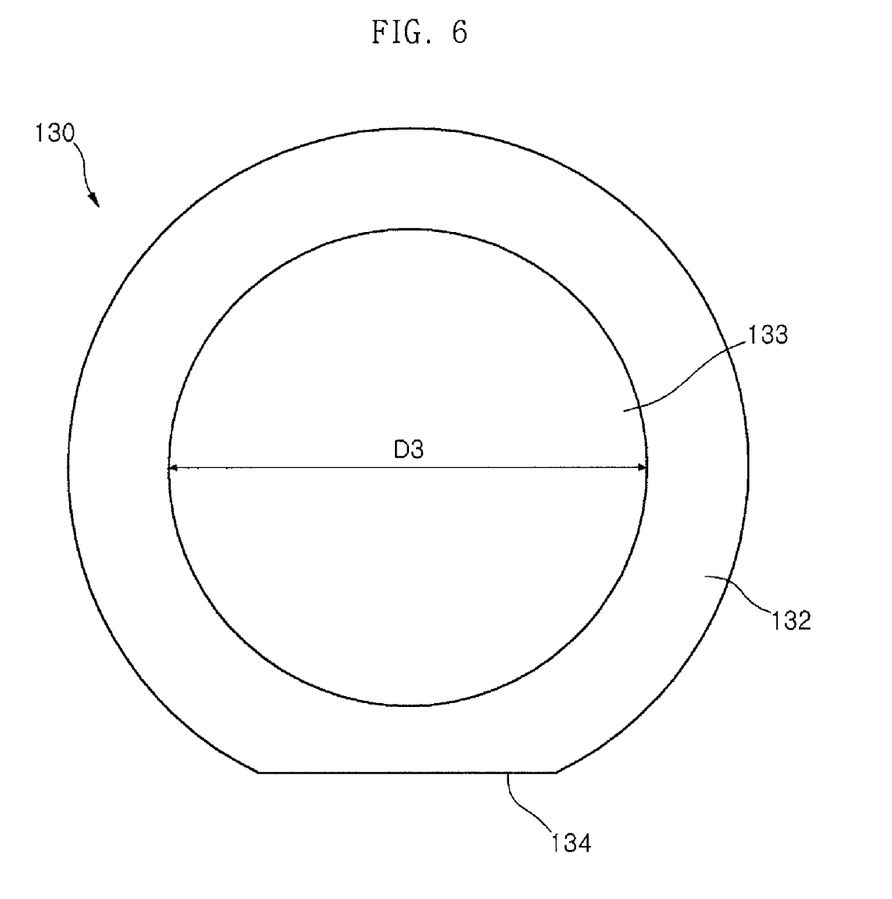
FIG. 6 is a plan view illustrating the gap member of FIG. 1.

Next, and referring to FIGS. 1, 5, and 6, the gap member 130 includes a sidewall part 131 having a circular shape and including a receiving portion 135, an opening part 133 defined in an inner center region of the sidewall part 131, and a reflective plate 132 disposed on an outer circumference of the opening 133. The gap member 130 is also disposed outside the light emitting module 101 and allows the light emitting module 101 and the lens 140 to be spaced a predetermined distance G1 from each other. The distance G1 forms a space 105 between the lens 140 and the board 110 to induce an illumination angle and the light distribution.

In addition, a silicon or silicon resin material may be filled into the space 105, but other materials may also be used. The board 110 is also received into the receiving portion 135 defined below the inside of the sidewall part 131 of the gap member 130. The light emitting diodes 120 are also exposed to the opening 133.

Further, an edge 143 of the lens 140 is disposed on an upper end of the sidewall 131 of the gap member 130. The reflective plate 132 also extends inwardly from a circumference of an upper end of the gap member 130 with a predetermined inclined surface. That is, the reflective plate 132 can be inclined at a predetermined inclined angle θ1 with respect to the outer circumference of the opening 133 of the gap member 130.

The inclined angle θ1 may also be set so that the reflective plate 132 becomes thinner in thickness from the outside thereof toward the inside. The inclined angle θ1 may also be changed according to a width of the reflective plate 132. For example, the inclined angle θ1 of the reflective plate 132 may range from about 0° to about 90° (0°<θ1<90°). Further, the reflective plate 132 corresponds to an outer bottom surface of the lens 140. Thus, a reflected light amount can be changed according to the inclined angle θ1 and the length of the reflective plate 132. As shown in FIGS. 5 and 6, the inner opening 133 of the reflective plate 132 has a circular shape having a predetermined diameter D3. In addition, a flat part 134 of the gap member 130 is disposed at a position corresponding to the flat part 114 of the board 110 of FIG. 3.

Figure 7:
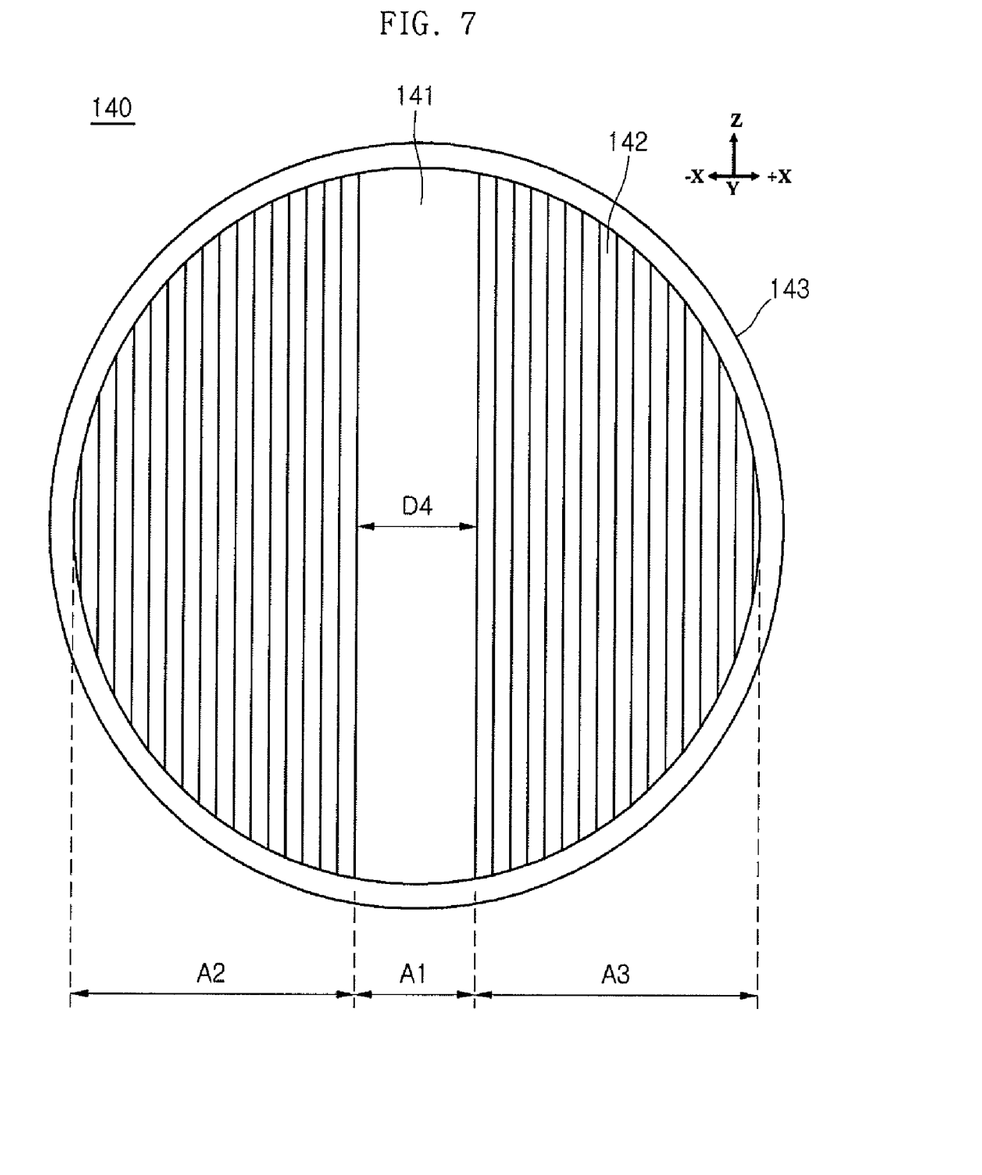
FIG. 7 is a rear view illustrating a lens of FIG. 1.
Figure 8:
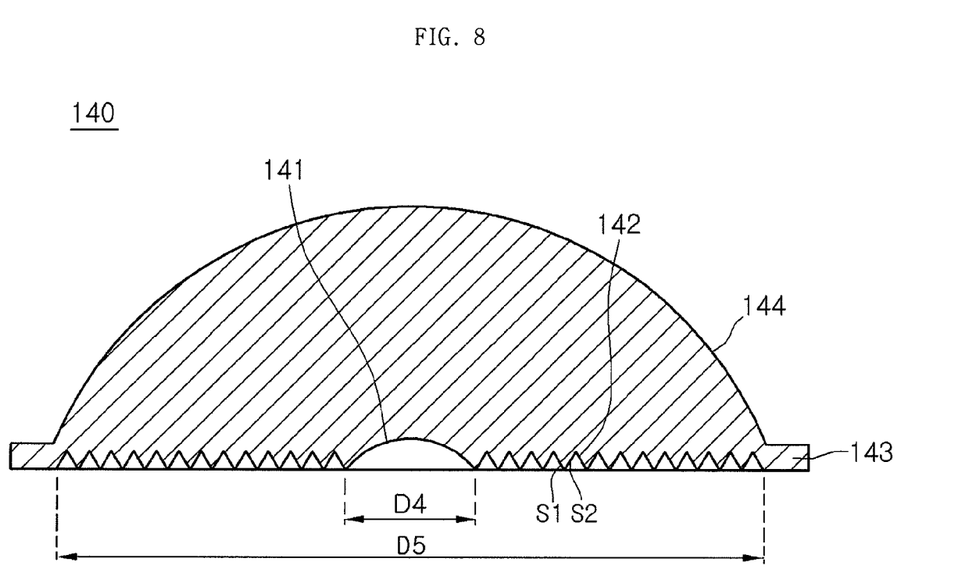
FIG. 8 is a side sectional view illustrating the lens of FIG. 1.

Referring to FIGS. 1, 7, and 8, the lens is disposed on the light emitting module 101. The cylindrical part 141 and prismatic parts 142 are also disposed on a light-incident side of the lens 140, and the light emitting part 144 is disposed on a light-emitting side. Further, the edge 143 having a circular shape is disposed around the light-incident side of the lens 140.

In addition, a light-transmitting material may be injection-molded to form the lens 140. The light-transmitting material may include a plastic material such as poly methyl methacrylate (PMMA) and polycarbonate (PC). Also, the cylindrical part 141 can be disposed in a direction of an axis Z perpendicular to an optical axis Y in a center region A1 of the light-incident side. The cylindrical part 141 can also have a lens shape, a semicircular shape, or a polygonal shape in a cross-sectional shape thereof. A diameter D4 of the cylindrical part 141 preferably has a width ranging from about ⅓ to about 1/10 with respect to a diameter D5 of the light-incident side.

The cylindrical part 141 of the lens 140 can also be disposed on the board 110. Further, prismatic patterns are arrayed on both sides of the cylindrical part 141 to form the prismatic parts 142. The prismatic patterns are disposed in the direction of the axis Z perpendicular to the optical axis Y, and apexes and valleys of the prismatic patterns are alternately arrayed in a direction of a horizontal axis (+X and −X). A distance between the patterns of the prismatic parts 142 can also be set to a preset distance, and the respective patterns may have a triangular shape in section. Both lateral surfaces S1 and S2 of the respective prismatic patterns can also have the same length and angle or have lengths and angles different from each other. Also, at least one of both lateral surfaces S1 and S2 can have a curved shape having a predetermined curvature, e.g., a convex curved shape.

Figure 17:
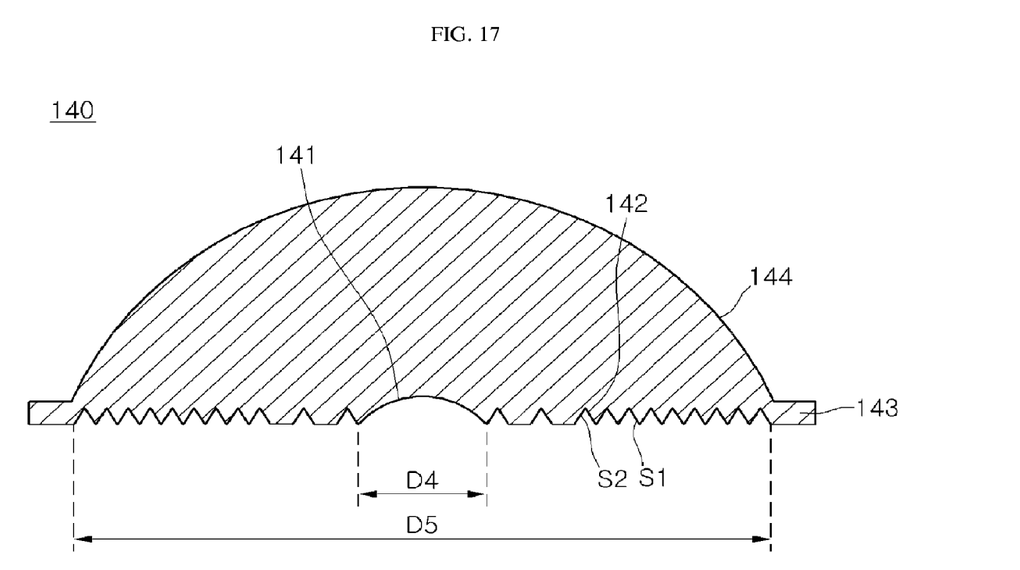
FIG. 17 is a side sectional view illustrating a random prismatic pattern of the lens of FIG. 1.

In addition, the prismatic patterns of the prismatic parts 142 can be spaced a predetermined distance or a random distance from each other as shown in FIG. 17. Further, the prismatic parts 142 can be axisymmetrically disposed about the cylindrical part 141, and the respective prismatic patterns can be disposed at a constant distance. The prismatic parts 142 can also be disposed at both sides of the cylindrical part 141 and not be disposed under the edge 143. In addition, because the prismatic parts 142 are disposed at both sides of the cylindrical part 141, e.g., left and right sides of the cylindrical part 141, the light distribution increases in left and right directions.

Further, the lens 140 refracts and distributes light incident into the center region A1 through the cylindrical part 141 of the light-incident side. The prismatic parts 142 also distribute light incident into both side regions A2 and A3 of the cylindrical part 141 in a horizontal direction.

In addition, the light emitting part 144 can be an aspherical lens having a hemisphere shape. The light emitting part 144 also reflects or refracts incident light to emit the reflected or refracted light to the outside. Also, the light emitting part 144 can be a spherical Lens. The aspherical lens or the spherical lens may be selected in consideration of the desired light distribution and the illuminance distribution.

Further, the light emitting part 144 refracts light incident through the cylindrical part 141 and the prismatic parts 142 to transmit or reflect the reflected light. Thus, the transmitted light can have a predetermined orientation distribution, and the reflected light can be converted into light having a light emitting angle via at least one of the prismatic parts 142, the reflective plate 132, and a top surface of the board 110, thereby transmitting light through the light emitting part 144.

Figure 9:
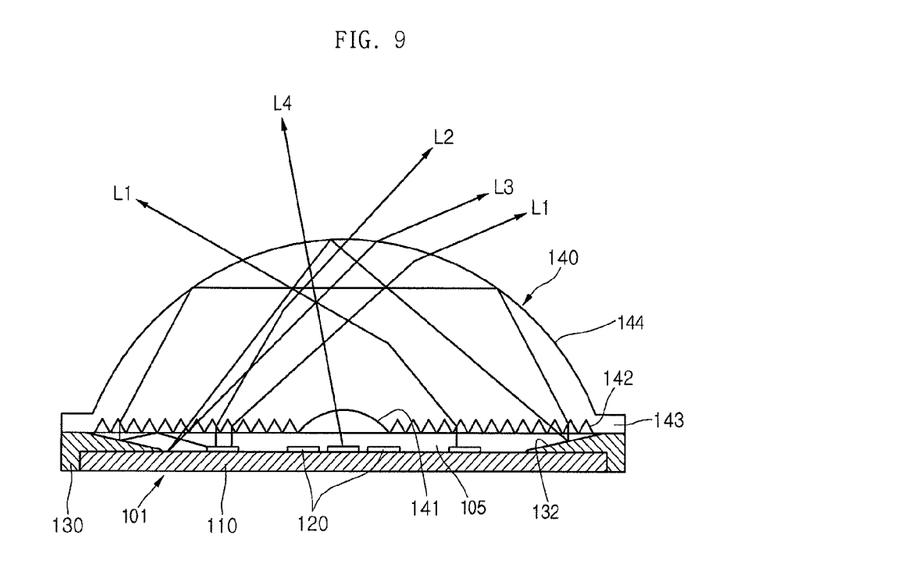
FIG. 9 is view illustrating light being emitted from the illumination unit of FIG. 1.

Next, referring to FIG. 9, light L1, L2, and L3 emitted from the side light emitting diodes 120 of the light emitting module 110 are distributed in a horizontal direction through the prismatic parts 142 of the lens 140. A portion L3 of the distributed light L1, L2, and L3 is reflected by the light emitting part 144 to change a critical angle of the light L3 through the reflective plate 132 of the gap member 130 and the prismatic parts 142 of the lens 140, thereby emitting the light L3 through the light emitting part 144. A portion L4 of light emitted from the center-side light emitting diode 120 of the light emitting module 110 is also refracted and distributed through the cylindrical part 141 of the lens 140 to emit the refracted and distributed light to the outside through the light emitting part 144.

Figure 10:
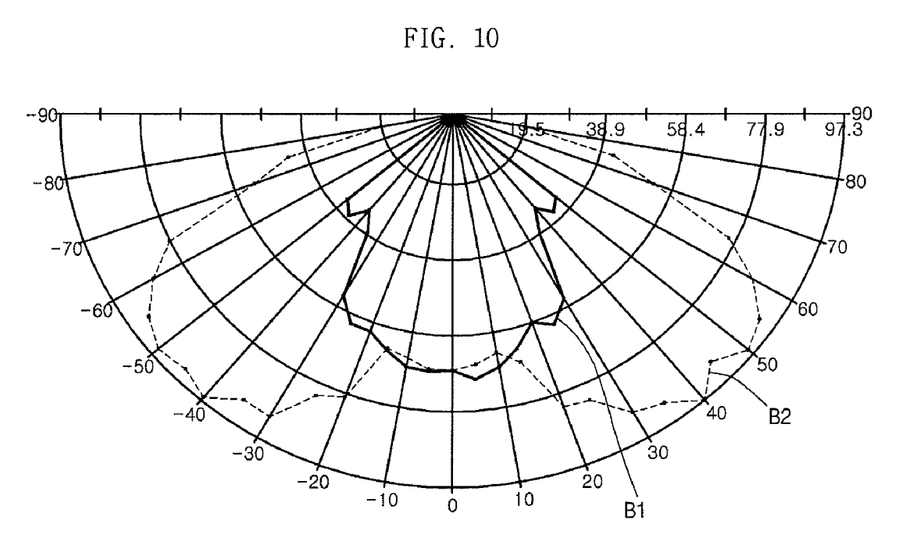
FIG. 10 is a view illustrating a light distribution of the illumination unit of FIG. 1.
Figure 11:
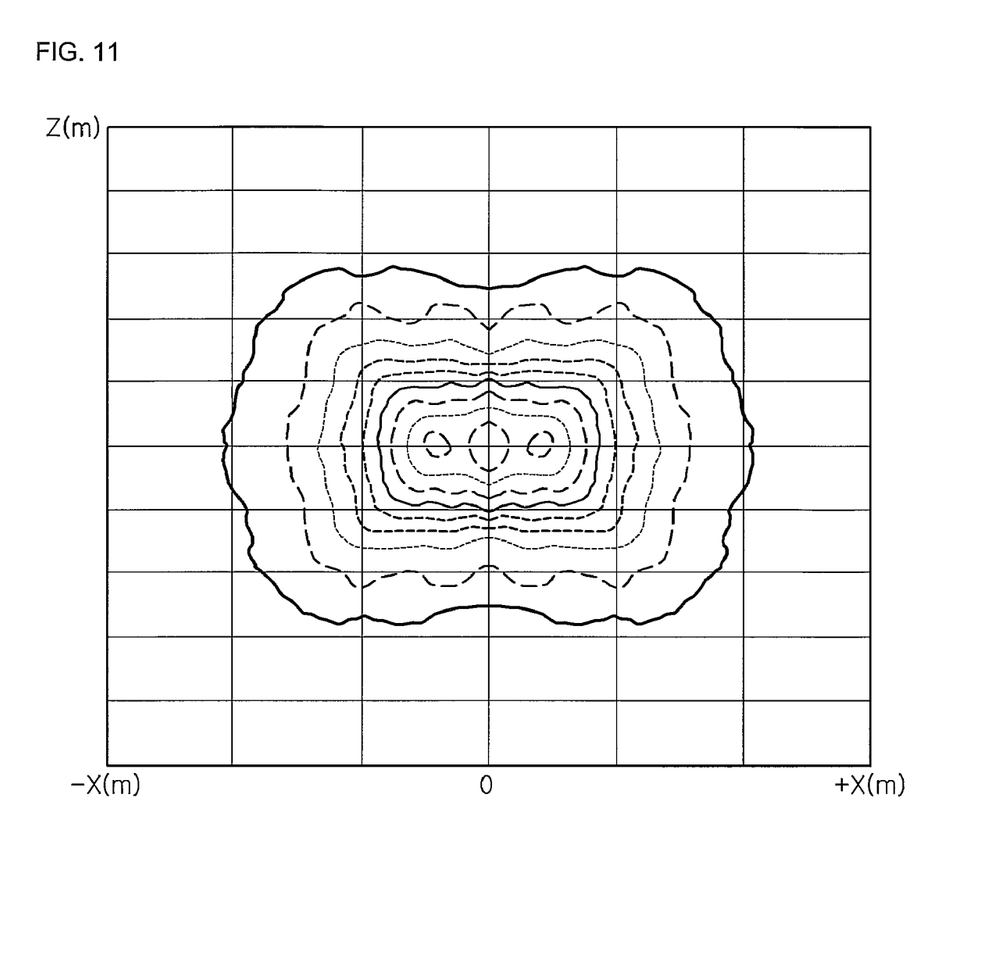
FIG. 11 is a view illustrating an illuminance distribution of the illumination unit of FIG. 1.

Next, FIGS. 10 and 11 are views illustrating a light distribution and illuminance distribution of the illumination unit of FIG. 1, respectively. Referring to FIGS. 10 and 11, the light distribution B1 in a front direction of the illumination unit 100 and the light distribution B2 in a side direction of the illumination unit 100 are defined by the cylindrical part 141 and the prismatic parts 142 of the lens 140. The light distribution B1 and B2 also improves the luminous intensities of a front lamp and side lamps. Thus, because the illumination distribution between the streetlights, for example, is improved, a blind spot can be reduced or removed. Also, a distance between the streetlights can be widened.

Further, referring to FIGS. 10 and 11, the illuminance distribution of the illumination unit 100 has a rectangular shape according to a distance of the lens 140. The illuminance distribution also has a rectangular shape due to the cylindrical part 141 of the lens 140 and the prismatic parts 142 disposed on both side of the cylindrical part 141. That is, the illuminance distribution due to the prismatic parts 142 increases distribution in a horizontal direction that is an X-axis (−X-axis) direction.

Figure 12:
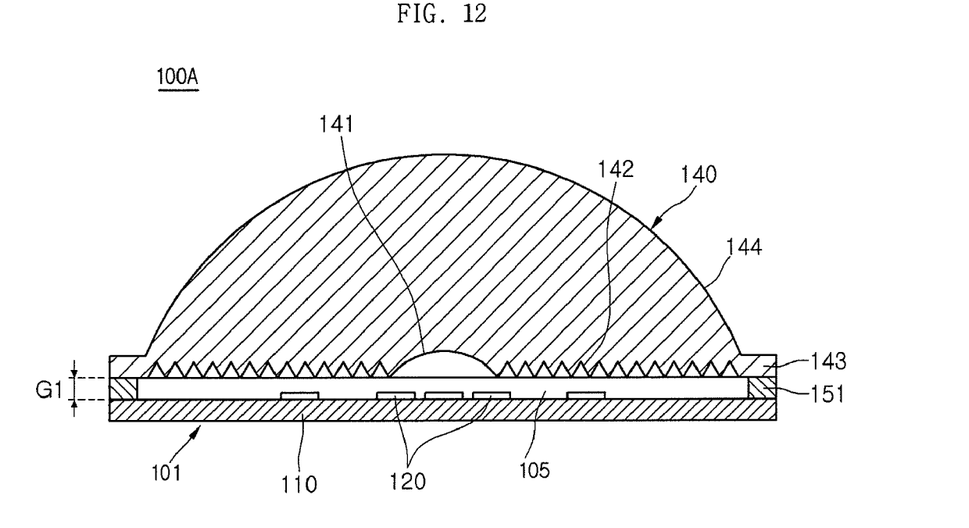
FIG. 12 is a side sectional view of an illumination unit according to a second embodiment of the present invention.

Next, FIG. 12 is a side sectional view of an illumination unit 100A according to a second embodiment of the present invention. Detailed descriptions of the same parts as those of the first embodiment are omitted. Referring to FIG. 12, the illumination unit 100A includes the light emitting module 101, the lens 140 and a gap member 151. The gap member 151 may be formed in a dam shape using an epoxy or silicon resin material. The gap member 151 is also disposed on an outer circumference between the board 110 and the lens 140 to space the board 110 a predetermined distance from the lens 140.

Further, the light orientation distribution of the light emitting diodes 120 is improved by a space defined by the gap member 151. In addition, the gap member 151 is disposed in a space between the board 110 and the lens 140, and a phosphor may be added to the gap member 151 as necessary. The gap member 151 also couples the board 110 of the light emitting module 101 to the lens 140. In addition, a reflective material for reflecting light traveling toward the board 110 may be coated on a top surface of the board 110 of the light emitting module 101. Other materials can also be coated on the board 100 or no coating can be coated on the board 110.

Figure 13:
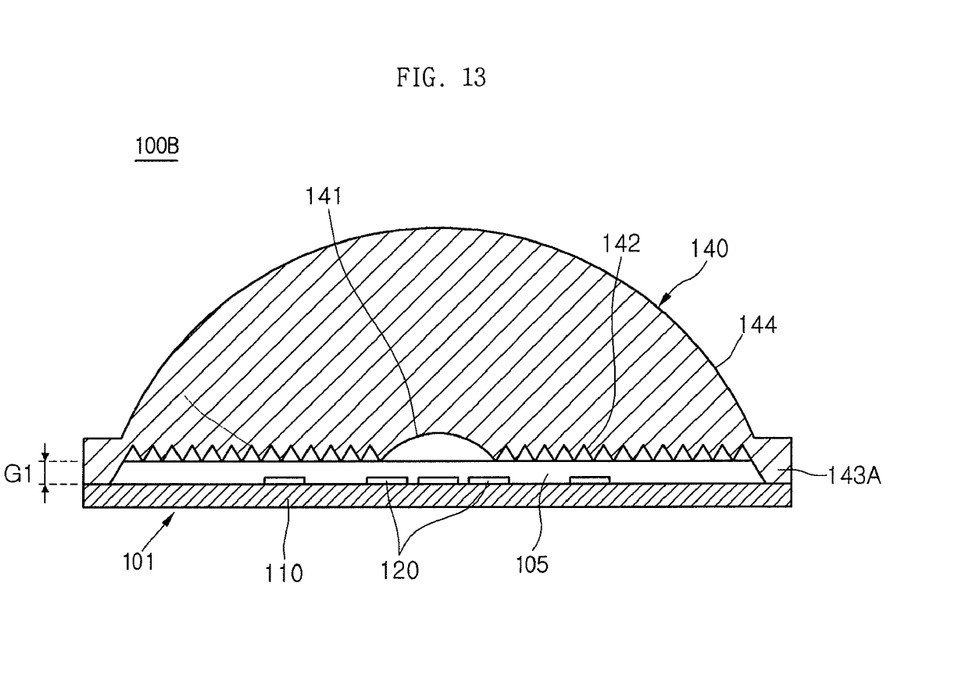
FIG. 13 is a side sectional view of an illumination unit according to a third embodiment of the present invention.

Next, FIG. 13 is a side sectional view of an illumination unit 100B according to a third embodiment of the present invention. Detailed descriptions of the same parts as those of the first embodiment are omitted. Referring to FIG. 13, the illumination unit 100B has a structure in which an edge 143A disposed at an outer circumference of a lens 140 protrudes. The edge 143A of the lens 140 can be disposed outside a top surface of the board 110 of the light emitting module 101 or be disposed on an outer surface of the board 110 of the light emitting module 101.

Further, the edge 143A of the lens 140 can constantly maintain a distance G1 between the board 110 of the light emitting module 101 and the lens 140. In addition, a resin material such as silicon or epoxy may be filled into a space 105 between the light emitting module 101 and the lens 140. A phosphor may also be added to the resin material.

Because the board 110 is disposed under the edge 143A of the lens 140, the edge 143A has a shape stepped with respect to an incident surface. In another example, a protrusion may be disposed around an outer circumference of the top surface of the board 110 to constantly maintain a distance between the board 110 and the lens 140.

Figure 14:
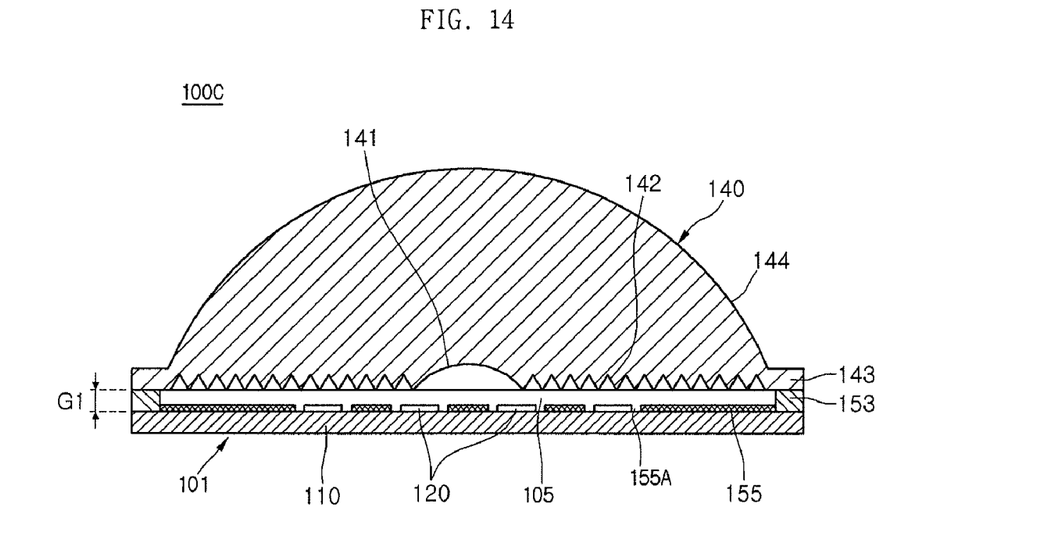
FIG. 14 is a side sectional view of an illumination unit according to a fourth embodiment of the present invention.

Next, FIG. 14 is a side sectional view of an illumination unit 100C according to a fourth embodiment of the present invention. Detailed descriptions of the same parts as those of the first embodiment are omitted. Referring to FIG. 14, the illumination unit 100C includes a reflective plate 155 disposed on the board 110 of the light emitting module 101. The reflective plate 155 also has a diode hole 155A and is disposed between light emitting diodes 120 of the board 110. Thus, a portion of light emitted from the light emitting diodes 120 can be reflected by the reflective plate 155 to increase a reflected light amount. Therefore, the light efficiency is improved.

In addition, a diffuser may be coated on a top surface of the reflective plate 155, but is not limited thereto. Further, a gap member 153 is disposed under the edge 143 of the lens 140 to constantly maintain a distance G1 between the lens 153 and the board 110. Because the space 105 defined between the lens 153 and the board 110 is provided, the light emitted from the light emitting diodes 120 is dispersed within the space 105 between the board 110 and the lens 140. The dispersed light is also dispersed through the prismatic part 142 and the cylindrical part 141 of the lens 140.

Figure 15:
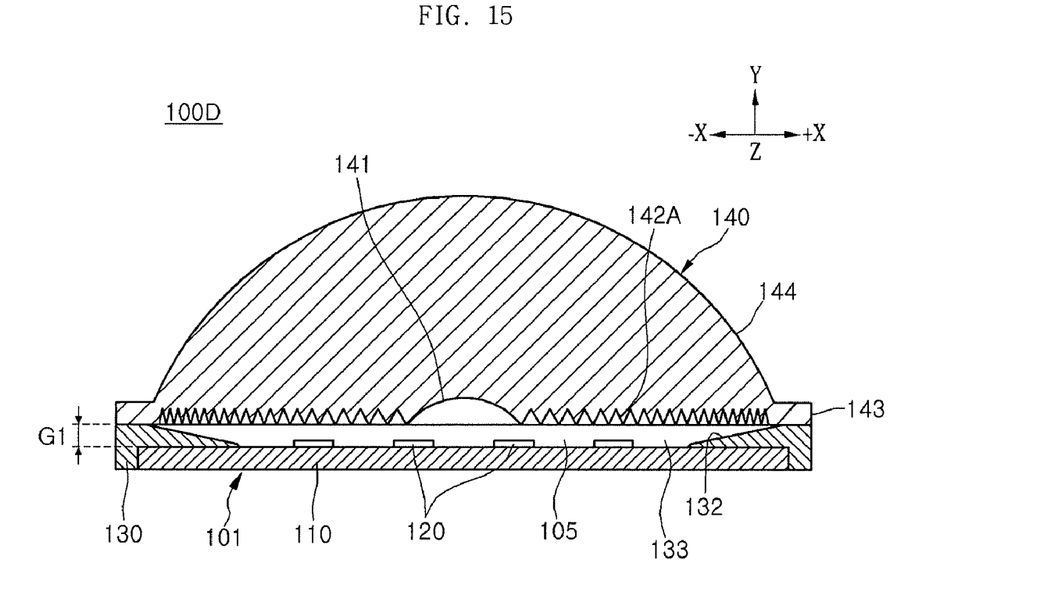
FIG. 15 is a side sectional view of an illumination unit according to a fifth embodiment of the present invention.

Next, FIG. 15 is a side sectional view of an illumination unit 100D according to a fifth embodiment of the present invention. Detailed descriptions of the same parts as those of the first embodiment are omitted. Referring to FIG. 15, the illumination unit 100D has a structure in which a prismatic part 142A of the lens 140 is modified. Prismatic patterns of the prismatic part 142A are formed such that widths and periods of the prismatic patterns become gradually narrower from a central portion of the cylindrical part 141 toward the outside thereof. The prismatic patterns thus improve optical losses that gradually increase toward the outside of the lens 140. Further, the prismatic patterns of the prismatic part 142A can be gradually dense toward both side directions (−X-axis and +X-axis). The dense degree may be changed according to light distribution, but is not limited thereto.

Figure 16:
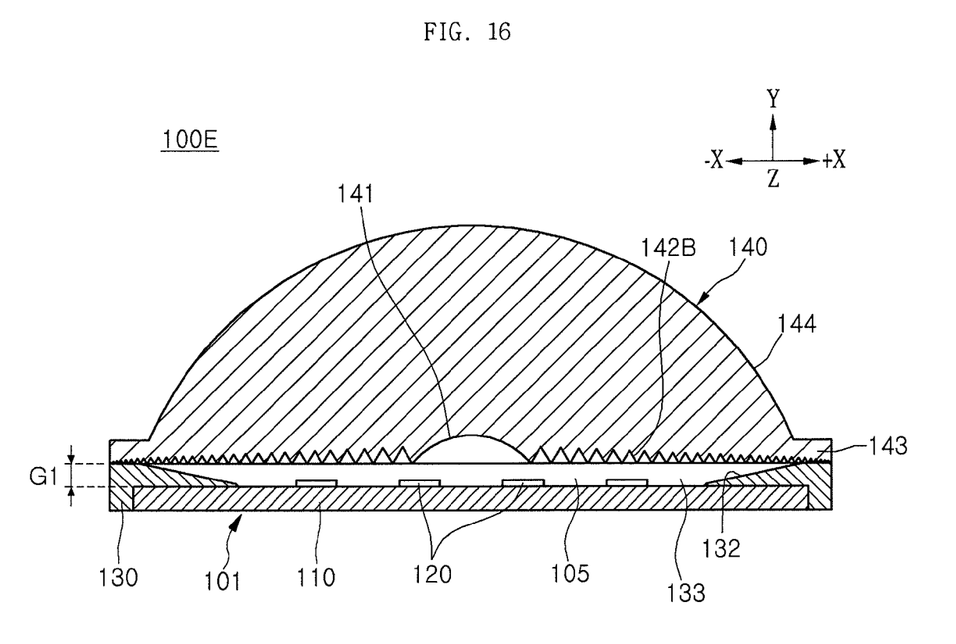
FIG. 16 is a side sectional view of an illumination unit according to a sixth embodiment of the present invention.

Next, FIG. 16 is a side sectional view of an illumination unit 100E according to a sixth embodiment of the present invention. Detailed descriptions of the same parts as those of the first embodiment are omitted. Referring to FIG. 16, the illumination unit 100E has a structure in which a prismatic part 142B of the lens 140 is modified. Prismatic patterns of the prismatic part 142B are formed such that apexes or valleys of the prismatic patterns are gradually reduced in size or height from a central portion of a cylindrical part 141 toward the outside thereof. The prismatic patterns thus improve optical losses at the outside of the lens 140 and light extraction efficiency. In addition, the prismatic patterns of the prismatic part 142 can extend up to a bottom surface of an edge 143, but is not limited thereto. The prismatic patterns of the prismatic part 142B can also be gradually dense toward both side directions (−X-axis and +X-axis). The dense degree may be changed according to light distribution, but is not limited thereto.

Embodiments of the present invention improve light distribution and illuminance distribution of outdoor lamps such as streetlights and provide the illumination unit having high illuminance distribution in consideration of a distance between the streetlights. Embodiments of the present invention also provide the illumination unit having a desired illuminance distribution without using a separate structure.

Further, embodiments of the present invention improve the light and illuminance distribution of the outdoor lamps such as the streetlights, outdoor lights, etc. Also, embodiments of the present invention provide the illumination unit having the illuminance distribution in consideration of the distance between the streetlights. Embodiments of the present invention further provide the illumination unit having the desired illuminance distribution without using the separate structure. In addition, because the embodiments of the present invention form a desired light distribution using the LED array and the lens which are flush with each other, lights having uncomplicated configurations are provided.

Further, the light emitting diodes (LEDs) have advantages such as low power consumption, long lifetime, and environment friendly properties. Thus, the arrayed LEDs and corresponding lens of the present invention provide advantages over traditional lighting.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illumination lens, comprising:
a first part being free of prismatic patterns to distribute light outside a width of the first part;
a second part including prismatic patterns on a side of the first part and increase light distribution in a side of the first part; and
a lens cover covering the first and second parts; wherein the first and second parts are disposed on a substantially same plane under the lens cover.

2. The illumination lens of claim 1, wherein the lens cover includes first and second edges extending from first and second outer surfaces of the second part and configured to be engaged with a gap member separating a board including light emitting diodes.

3. The illumination lens of claim 1, wherein the lens cover includes first and second edges extending horizontally from first and second outer surfaces of the second part and protruding vertically so as to maintain a separation of the illumination lens from a board including light emitting diodes.

4. The illumination lens of claim 1, wherein the first part, the second part and the lens cover are integrally formed together as a single unit.

5. The illumination lens of claim 1, wherein the first part has a semicircular shape or a polygonal shape.

6. The illumination lens of claim 1, wherein the second part is axisymmetrically disposed about the first part.

7. The illumination lens of claim 1, wherein each pattern of the prismatic part has a triangular shape.

8. The illumination lens of claim 1, wherein the prismatic patterns are randomly disposed.

9. The illumination lens of claim 1, wherein the prismatic patterns are arranged on both sides of the cylindrical part with a predetermined distance from each other.

10. The illumination lens of claim 1, wherein distances between the prismatic patterns become gradually narrower as the prismatic patterns move away from the first part.

11. The illumination lens of claim 1, wherein the prismatic patterns are constant in size.

12. The illumination lens of claim 1, wherein the lens cover comprises an aspherical lens or a spherical lens.

13. The illumination lens of claim 1, wherein the width of the first part is about $1/3$ to about $1/10$ the width of a diameter of the lens cover.

14. An illumination unit, comprising:
an illumination lens including a first part being free of prismatic patterns to distribute light outside a width of the first part;
a second part including prismatic patterns on a side of the first part and increase light distribution in said both sides of the first part;
a lens cover covering the first and second parts with said first and second parts being disposed on a substantially same plane under the lens cover; and
a light emitting module disposed under the illumination lens and including a plurality of light emitting diodes mounted on a board.

15. The illumination unit of claim 14, further comprising:
a gap member configured to maintain a gap between the board and the illumination lens.

16. The illumination unit of claim 15, wherein the gap member is disposed on an outer circumference between the illumination lens and the board.

17. The illumination unit of claim 15, wherein the gap member includes a reflective plate inclinedly disposed between the board and the prismatic patterns.

18. The illumination unit of claim 15, wherein the gap member includes a resin material or a glass material.

19. The illumination unit of claim 15, wherein the lens cover includes first and second edges extending horizontally from first and second outer surfaces of the second part and protruding vertically so as to maintain a separation of the illumination lens from the board.

20. The illumination unit of claim 15, wherein the gap member includes a resin material with phosphor between the illumination lens and the board.

21. The illumination unit of claim 14, further comprising:
a reflective plate coupled to the board and having a plurality of holes for receiving the plurality of light emitting diodes.

22. The illumination unit of claim 14, wherein the illumination lens distributes light in a pattern having a rectangular shape.

23. The illumination unit of claim 14, wherein at least one of the light emitting diodes is disposed under the first part of the illumination lens.

24. The illumination unit of claim 14, further comprising:
a reflective material on a top surface of the board and configured to reflect light emitted by the light emitting diodes.

* * * * *